(12) United States Patent
Childs et al.

(10) Patent No.: US 8,019,051 B1
(45) Date of Patent: Sep. 13, 2011

(54) METHOD AND APPARATUS FOR ORDERING COMMUNICATIONS

(75) Inventors: Jane Childs, New South Wales (AU); Ted Saoumi, New South Wales (AU)

(73) Assignee: Avaya Inc., Basking Ridge, NJ (US)

( * ) Notice: Subject to any disclaimer, the term of this patent is extended or adjusted under 35 U.S.C. 154(b) by 1175 days.

(21) Appl. No.: 11/465,069

(22) Filed: Aug. 16, 2006

(51) Int. Cl.
*H04M 1/64* (2006.01)
*H04M 11/00* (2006.01)

(52) U.S. Cl. .................................. 379/67.1; 379/88.13

(58) Field of Classification Search .............. 379/67.1, 379/68, 88.11, 88.04, 88.22, 88.26
See application file for complete search history.

(56) References Cited

U.S. PATENT DOCUMENTS

| | | | |
|---|---|---|---|
| 5,167,010 A | 11/1992 | Elm et al. | |
| 6,266,400 B1 | 7/2001 | Castagna | |
| 6,327,343 B1 | 12/2001 | Epstein et al. | |
| 6,335,962 B1 * | 1/2002 | Ali et al. | 379/88.11 |
| 6,665,379 B1 | 12/2003 | Brown et al. | |
| 6,741,680 B2 | 5/2004 | Bates et al. | |
| 6,792,082 B1 * | 9/2004 | Levine | 379/67.1 |
| 6,826,264 B2 * | 11/2004 | Valco et al. | 379/67.1 |
| 7,076,529 B2 * | 7/2006 | Koch et al. | 709/206 |
| 2005/0058261 A1 * | 3/2005 | Baumard | 379/67.1 |

FOREIGN PATENT DOCUMENTS

| | | |
|---|---|---|
| EP | 0946032 A2 | 9/1999 |
| EP | 0935378 A2 | 11/1999 |

* cited by examiner

*Primary Examiner* — Davetta W Goins
*Assistant Examiner* — Mohammed Islam
(74) *Attorney, Agent, or Firm* — Sheridan Ross P.C.

(57) ABSTRACT

The present invention provides for the ranking of messages for presentation to a user based on user behavior with respect to previous messages received from ranked communication endpoints. In particular, the percentage of a message played back by a user can be used to assigned a rank for future messages received from the initiating communication endpoint associated with the subject message. Initiating communication endpoints associated with messages that the user has listened to all or a large proportion of are associated with a relatively high ranking that is applied to future messages from those communication endpoints. Initiating communication endpoints associated with messages that the user listens to only the message header or a small proportion of the message itself are assigned a relatively low ranking. Messages received as textual communications or by a unified messaging application may be ranked according to the order in which the user selects the messages for retrieval.

21 Claims, 4 Drawing Sheets

| % of Message Played | | | | | |
|---|---|---|---|---|---|
| Caller ID | Message 1 | Message 2 | Message 3 | Avge | Rank |
| 9991 | 0% | 100% | 40% | 47% | 4 |
| 9992 | 50% | 80% | 80% | 70% | 3 |
| 9993 | 100% | 70% | 90% | 87% | 1 |
| 9994 | 100% | 100% | 50% | 83% | 2 |
| 9995 | 30% | 40% | 20% | 30% | 5 |

*Fig. 4*

METHOD AND APPARATUS FOR ORDERING COMMUNICATIONS

FIELD

The present invention is related to messaging applications. More particularly, the present invention provides for ordering communications based on a prediction of user preference.

BACKGROUND

Messaging applications such as voicemail are widely used to collect messages directed to a user, when the user is unavailable for real-time communications. According to such systems, messages are typically replayed according to the order in which they were received. Oftentimes, a user can determine from header information, such as information identifying a calling party, that the user is not interested in listening to the message. In such a case, the user can immediately delete the message or skip over it to access the next message in the mailbox. For other messages, the user may listen to less than all of the message content. For example, a user may be able to determine from the first portion of a message that the remaining portion is not pertinent or not of interest to the user. Accordingly, once the user has heard a sufficient portion of the content to make that determination, the user can delete the message or skip over it to access the next message in the mailbox. The process of identifying and accessing messages that are of particular interest to the user can be time consuming and cumbersome, particularly when the user has a large number of messages in their mailbox.

In order to streamline the process for accessing messages in a user mailbox, systems have been developed that attempt to prioritize messages. For instance, messages can be grouped according to the calling party or defined groups of calling parties. For example, a user could create a group for messages from family members and a separate group for messages from work colleagues, by defining communication identification attributes that are associated with the different groups. Still other systems have allowed users to define priorities for different groups. Accordingly, a user can be presented with messages according to the user-defined priority for the group that the message is determined to be associated with. However, such systems require a significant amount of user administration.

Other systems have been proposed that are capable of automatically assigning a priority to messages based on the frequency with which messages from the caller are left for the user. Assigning a priority based on the frequency with which the user initiates calls to a calling party has also been discussed as a way for prioritizing received messages. Although such systems provide an automated means for prioritizing messages, they do not do so based on information regarding the treatment of messages from different callers by the user. Accordingly, such automated systems are limited in their ability to prioritize messages according to a user's level of interest in those messages.

SUMMARY

The present invention is directed to solving these and other problems and disadvantages of the prior art. In accordance with embodiments of the present invention, the order in which communications in a user mailbox are presented to the user is according to predictions that have been made regarding the user's level of interest in each of the messages. More particularly, messages are ranked or prioritized according to user actions that have been taken with respect to previous messages associated with the same communication identifier. Accordingly, past behavior of the user with respect to previous messages from a sender can be used to predict the level of interest that the user will have in subsequent messages from that same sender.

In accordance with embodiments of the present invention, voicemail messages left in a user's mailbox are associated with header information. Such header information may include information about the message. Examples of header information include the date and time that the message was received, the name of the calling party or an entity with which the calling party is associated, and/or a calling number associated with a calling communication endpoint. The message header information can be presented in various ways, including using text-to-speech and/or interactive voice response techniques, and/or the visual display of identifying information, for instance through a telephony device or other user communication endpoint used to access the user's mailbox. If the user accesses only the message header information or a portion of the message header information for a message, it can be assumed that the user associates a low priority with the calling party. Accordingly, subsequent messages associated with that same calling party (e.g., associated with the same caller ID information) will be assigned a low rank.

After the user is presented with message header information, the message content may be presented to the user. In accordance with embodiments of the present invention, the percentage of a message listened to by the user is determined and recorded. Where multiple messages received at the user mailbox are associated with the same identifier, an average length of time as a percentage that messages associated with that identifier are listened to by the user can be determined and used in connection with prioritizing subsequent messages associated with that identifier. In general, messages associated with identifiers for which it has been determined that the user listens to a relatively high percentage of the associated message content will receive a higher ranking than messages associated with identifiers where the user has listened to a smaller proportion of the message in the past.

In accordance with embodiments of the present invention, an application is provided for ranking communication endpoint identifiers according to the user's predicted order of preference. This application may be executed by a messaging server, for example a voice messaging or unified messaging server. Furthermore, embodiments of the present invention may comprise an application integrated into a messaging application. In accordance with other embodiments of the present invention, ordering of messages may be applied to messages of different media types. For example, in addition to ordering voicemail messages, textual messages, such as e-mail messages may be ordered. In connection with textual messages, messages may be ranked according to the order in which the user has read e-mails in the past (i.e., according to the user's order of reading preference) and whether the e-mail message is left open long enough to read.

BRIEF DESCRIPTION OF THE DRAWINGS

FIG. 4 depicts a collection of data for prioritizing messages in accordance with embodiments of the present invention.

DETAILED DESCRIPTION

Figure 1:
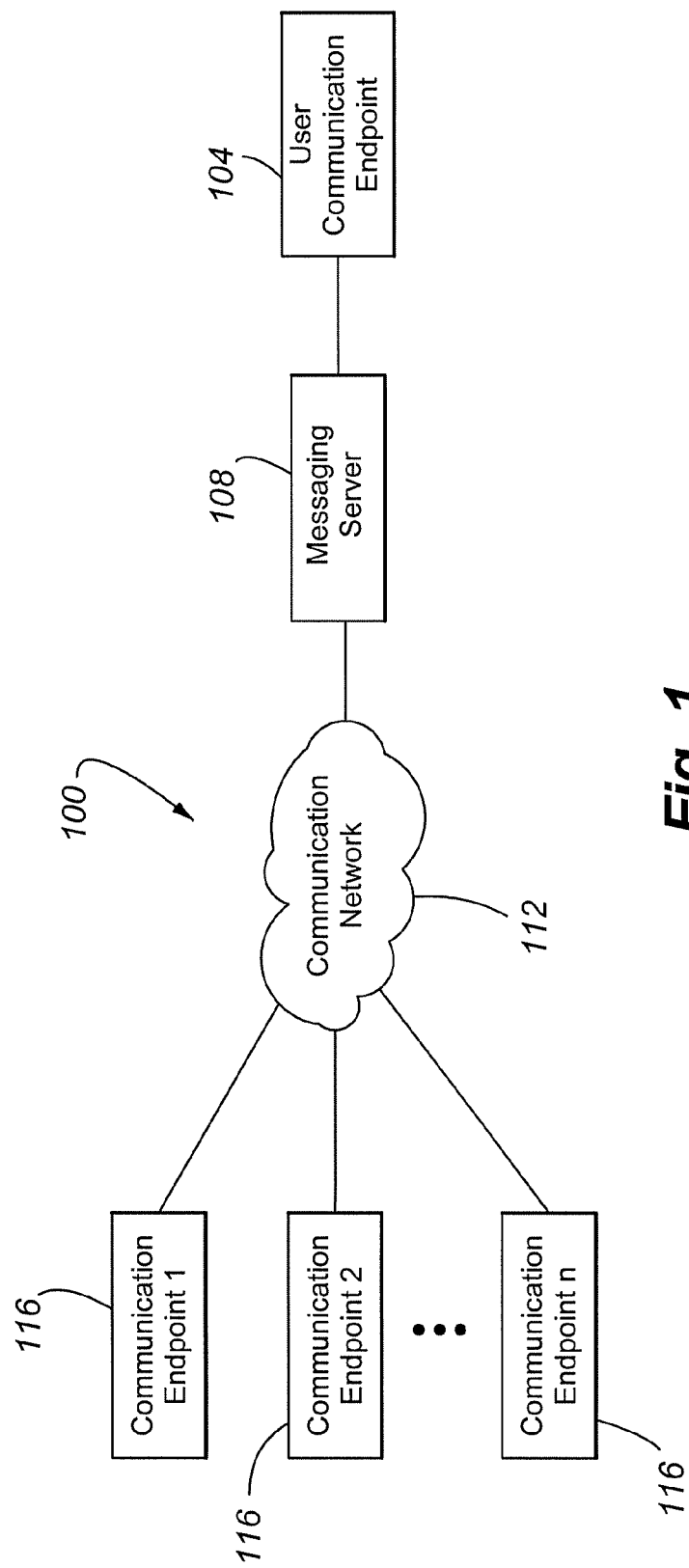
FIG. 1 is a block diagram depicting components of a system incorporating message ranking features in accordance with embodiments of the present invention.

FIG. 1 is a block diagram depicting components of a system 100 incorporating message ranking features in accordance with embodiments of the present invention. The system 100 generally includes a user communication endpoint or interface 104 interconnected to a messaging server 108. The messaging server 108 is interconnected to a communication network 112. The communication network 112 in turn be connected to a number of communication endpoints 116.

A user communication endpoint 104 may comprise any device or facility that allows a user to access messages. For example, a user communication endpoint 104 may comprise a voice telephony device, such as a wireline telephone, a cellular telephone, or a voice over Internet Protocol (VoIP) telephone. As a further example, the user communication end point 104 may comprise a computer that provides communication functionality, for example, through an email or other text message application, or a soft IP telephone function. Moreover, a single user communication endpoint 104 may support different communication media. For example, a user communication endpoint 104 may comprise a cellular telephone supporting voice telephony and text messaging functions, a personal digital assistant (PDA) supporting voice, text messaging or email communications, and a general purpose computer supporting text messaging, email, or voice telephony and/or text messaging communications. Still another example of a user communication endpoint 104 is a device for supporting video telephony communications. Accordingly, it can be appreciated that a user communication endpoint 104 is not limited to any particular type of communication device or media.

The messaging server 108 may comprise a server computer or application running on a communication system switch that provides a facility for collecting messages directed to a user communication endpoint 104. Particular examples of a messaging server 108 include a voicemail messaging server, a video mail messaging server, an email server, and a text messaging server. Moreover, the functions of the messaging server 108 may be combined with other devices. For instance, the messaging server 108 may be provided as part of a communication server, such as a private branch exchange (PRX) system or a telephony system switch.

The communication network 112 may comprise any network or combinations of networks capable of supporting the transmission of messages intended for a user to a messaging facility as provided by a messaging server 108. Accordingly, examples of a communication network 112 include the public switched telephony network (PSTN), the Internet, or a private intranet. A communication network 112 may also comprise a cellular or other wireless communication network.

The communication endpoint 116 may comprise any type of communication device capable of receiving input from a party attempting to contact a user for inclusion in a message for a user. Accordingly, examples of communication endpoints 116 include wireline or wireless telephones, soft telephones, PDAs and general-purpose computers. Although three communication endpoints 116 are illustrated in FIG. 1 it should be appreciated that any number of communication endpoints 116 may be included in the system 100.

Figure 2:
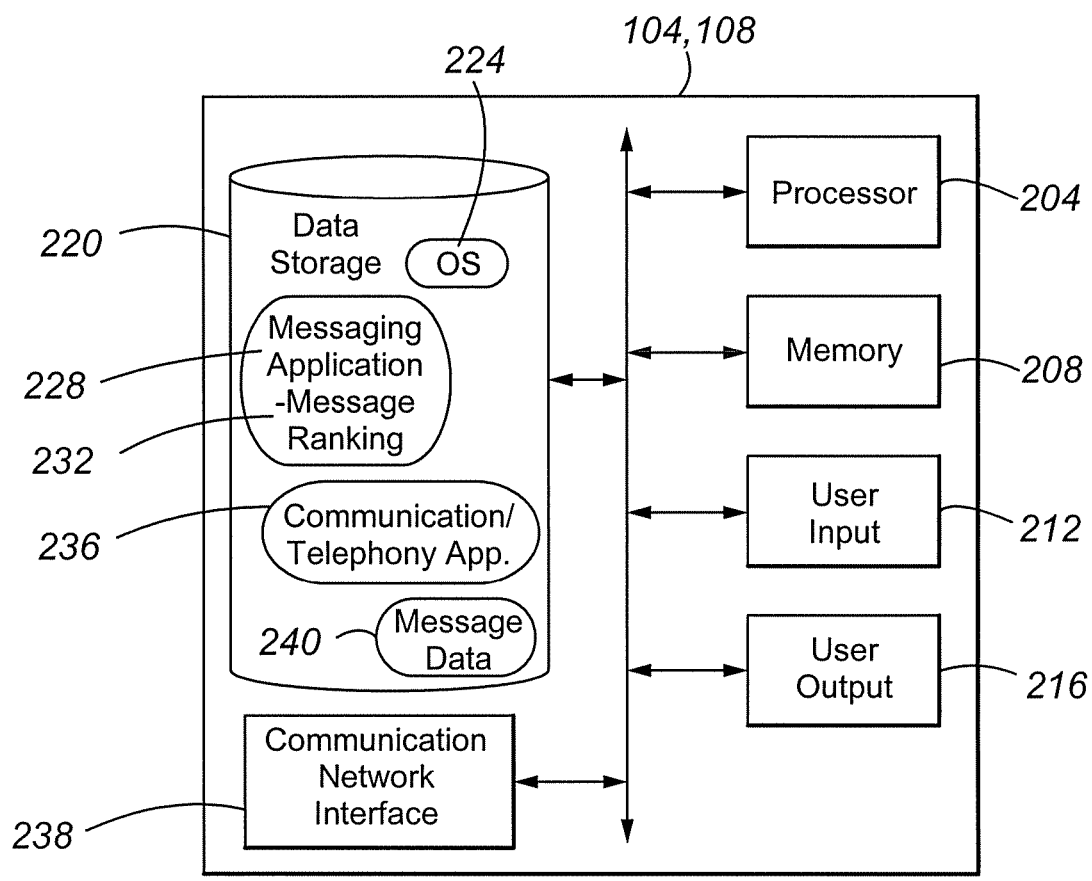
FIG. 2 is a block diagram of components of a user communication endpoint or a messaging server capable of providing message ranking in accordance with embodiments of the present invention.

FIG. 2 is a block diagram of components of a user communication endpoint 104 or a messaging server 108 in accordance with embodiments of the present invention. The components may include a processor 204 capable of executing program instructions. Accordingly, the processor 204 may include any general-purpose programmable processor or controller for executing application programming. Alternatively, the processor 204 may comprise a specially configured application specific integrated circuit (ASIC). The processor 204 generally functions to run programming code implementing various of the functions performed by the user communication endpoint 104 and/or the messaging server 108, including message ranking functions as described herein.

A user communication endpoint 104 and/or messaging server 108 may additionally include memory 208 for use in connection with the execution of programming by the processor 204 and for the temporary or long-term storage of data or program instructions. The memory 208 may comprise solid-state memory resident, removable or remote in nature such as DRAM and SDRAM. Where the processor 208 comprises a controller, the memory 208 may be integral to the processor 204. In addition, various input devices 212 and user output devices 216 may be provided. Examples of input devices 212 include a keyboard, numeric keypad, microphone, and pointing device combined with a screen or other position encoder. Examples of output devices 216 include a video display, an alpha-numeric display, a speaker, a ringer, a printer port or indicator lights.

A user communication endpoint 104 or a messaging server 108 may also include data storage 220 for the storage of application programming and/or data. For example, operating system software 224 may be stored in the data storage 220. Examples of applications that may be stored in the data storage 220 include a messaging application 228. The messaging application 228 may comprise instructions for implementing a voicemail message system, an email or other textual message system or mailbox, a unified messaging system, or a message system for any other communications media. Moreover, a messaging application 228 in accordance with embodiments of the present invention may provide or be associated with a message ranking application or function 232 for ranking messages in response to user actions with respect to user actions. Another example of an application that may be stored in data storage 220 includes a communication or telephony application 236. For example, a user communication endpoint 104 may include a telephony application 236 comprising instructions for performing telephony functions in support of telephony communications. As a further example, a messaging server 108 may comprise a communication application for supporting telephony or textual messages. The data storage 220 may also provide storage for message data 240. Accordingly, it can be appreciated by one of skill in the art after consideration of the present disclosure that a messaging application 228 and message ranking application 232 may be implemented by programming or instructions on a user communication endpoint 104 itself, with or without cooperating applications running on a messaging server 108.

A user communication endpoint 104 and/or a messaging server 108 may also include one or more communication network interfaces 238. For example, a user communication endpoint 104 or a messaging server 108 may include a communication network interface 238 comprising a network interface card (NIC), a modem, a telephony port, a serial or parallel data port, or other wireline or wireless communication network interface.

Figure 3:
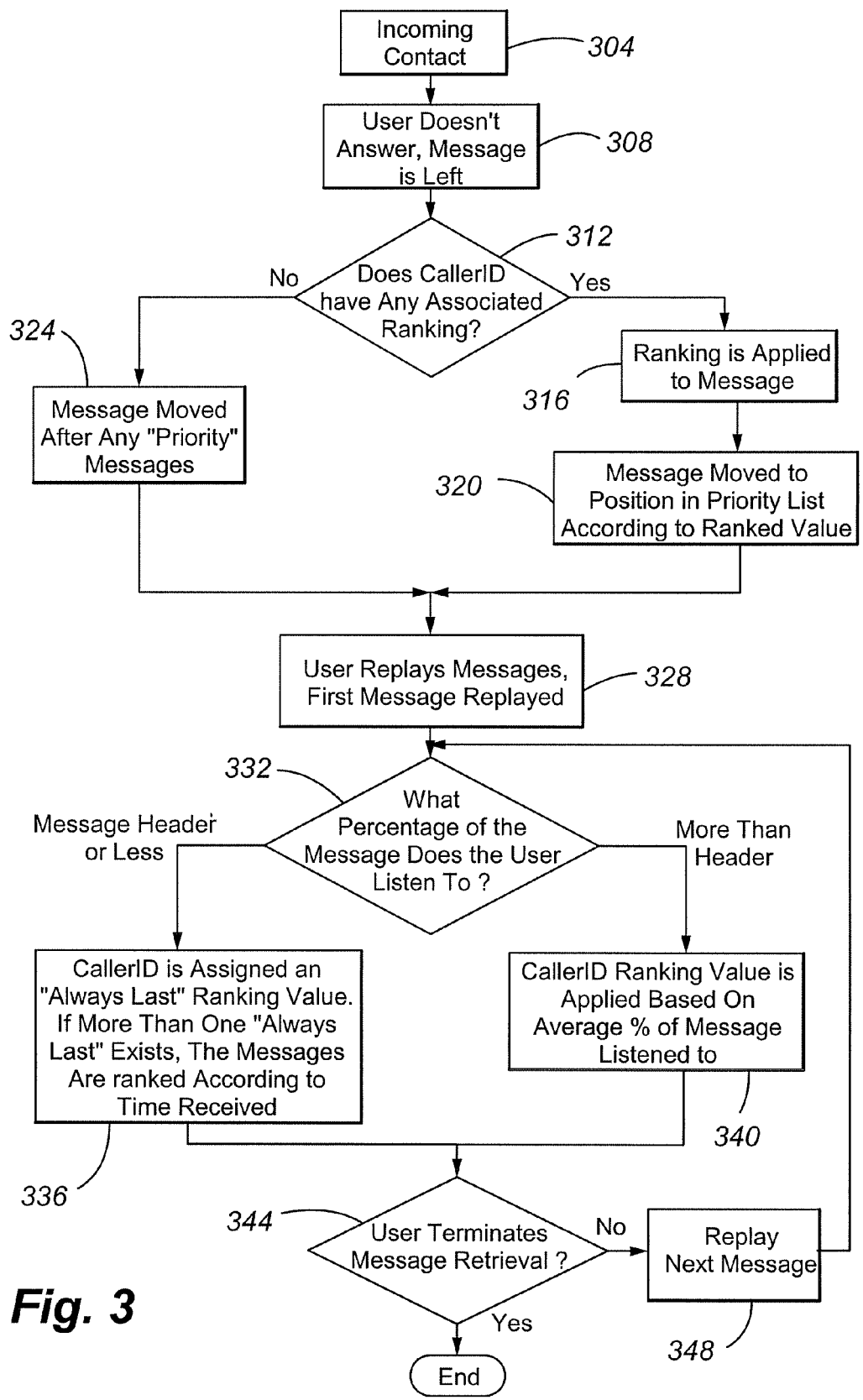
FIG. 3 is a block diagram depicting aspects of the operation of a message ranking application in accordance with embodiments of the present invention.

FIG. 3 is a block diagram depicting aspects of the operation of a message ranking application 232 in accordance with embodiments of the present invention. Initially, an incoming contact 304, addressed to a user communication endpoint 104 and placed by a sending communication endpoint 116 is detected by a messaging application 228. At step 308, the messaging application 228 collects the message as the message data 240. In the context of a voice or video telephony contact or call, the message data 240 is collected from an initiating communication endpoint 116 after the user does not answer the contact or call at the user communication endpoint 104. In the context of a non-real time text message, data message 240 comprising the text of the message may be stored as message data 240 once the communication is detected by the messaging application 228.

A determination is then made as to whether an address or other identifier associated with the initiating communication endpoint 116 has an associated ranking (step 312). If the initiating communication endpoint 116 is associated with an address or identifier that has been ranked by the message ranking application 232 associated with the messaging application 228, that ranking is applied to the received message (step 316). The received message is then moved or assigned to the position in the priority list according to the ranked value for the address or identifier of the initiating communication endpoint 116 (step 320). If the initiating communication endpoint 116 is not associated with an address or identifier that has been ranked by the message ranking application 232, the message is moved or assigned to a position in the list of messages after any priority messages held as message data 240 in the users mailbox (step 324). In general, the process of receiving messages and assigning them to the priority list may be performed for each message directed to the user communication endpoint 104 that is sent to the mailbox for that user communication endpoint 104.

After received messages have been assigned to a position in the priority list, the user replays their messages (step 328). In particular, the first message in the prioritized list of messages is presented to the user. The message ranking application 232 then determines what percentage of the message the user listens to (step 332). If the user listens to just the message header information or a portion of the header information before deleting the message or terminating playback and moving to the next message, the address or identifier associated with the communication endpoint 116 that initiated the subject message is assigned an "always last" ranking value (step 336). If more than one "always last" address or identifier has already been assigned, messages from such communication endpoints 116 may be ranked relative to one another according to the time at which they were received. As can be appreciated by one of skill in the art, a message header may include different information depending on the particular messaging application 228 that presents the information. Typically, a message header includes the date and time at which the message was recorded and information identifying the initiating communication endpoint 116. For example, a telephone number, email address or the name of the person who initiated the contact or who is associated with the initiating communication endpoint 116.

If the user listens to more than the header information, the ranking value for the address or other identifier of the initiating communication endpoint 116 is assigned a rank based on the average percent of the message that the user listens to (step 340).

In FIG. 4 a collection of data for prioritizing messages in accordance with embodiments of the present invention and according to the percentage of messages from different initiating communication endpoints 116 listened to by a user is illustrated. According to this example, information on the percentage of messages listened by a user for each of a number of initiating communication endpoints 116 is maintained. More particularly, different initiating communication endpoints 116 are identified in a first column 404 by a caller ID number, depicted in the figure as the last four digits of the associated calling telephone number. Percentage information related to the amount of a message listened to by the user for a number of messages associated with each initiating communication endpoint 116 caller ID 404 are shown in the columns message 1 408a, message 2 408b, and message 3 408c. From the data in the individual columns 408a through 408c, an average percent 412 is computed for each of the initiating communication endpoints 116. A rank 416 is then applied to each initiating communication endpoint 116, based on the calculated average percent 412. More particularly, the highest ranking is associated with the caller ID 404 of the initiating communication endpoint 116 for which the user has listened to the greatest percentage of the messages that have been left. The lowest ranking is assigned to the caller ID 404 associated with messages that the user listened to the smallest percentage. It is the rank 416 that is used to determine the position in the priority list of messages received. Accordingly, it can be appreciated that embodiments of the present invention are capable of being trained such that the order in which future messages are presented to the user is determined from the user's past actions in connection with other messages from initiating communication endpoints 116.

Referring again to FIG. 3, after assigning or applying a ranking value to a message for calculating or determining message ranking values, a determination is made as to whether the user has terminated message retrieval (step 334). If the user has not terminated message retrieval, the next message is replayed to the user (step 348) and the process returns to 332 to determine what percentage of the retrieved message is listened to by the user for future message ranking purposes. If the user is determined to have terminated message retrieval at step 344, the process may end.

In connection with messaging applications 228 that presents textual information to a user, such as header information identifying the date, sending address, and subject of email correspondence or email and voice or video telephony messages in connection with a unified messaging application, other considerations may be used as an alternative or in addition to the considerations described above in connection with voice and video telephony messaging systems that play back messages to the user. In such embodiments, a ranking may be applied according to the order in which the user selects from a list of messages that it is presented for reading or play back of the message itself. Moreover, the determination of rank from the order in which individual messages are selected can be combined with the described techniques associated with determining the percent of a message played back to the user that the user listens to or watches. Therefore, the use of user actions or behavior in connection with messages from particular initiating communication endpoints 116 in order to rank a presentation of messages to the user can be used in connection with text or unified messaging applications, in addition to voice or video mailbox applications.

The foregoing discussion of the invention has been presented for purposes of illustration and description. Further, the description is not intended to limit the invention to the form disclosed herein. Consequently, variations and modifications combined with the above teachings, within the skill or knowledge of the relevant art, are within the scope of the present invention. Embodiments described hereinabove are further intended to explain the best mode presently known of practicing the invention and to enable others skilled in the art to utilize the invention in such and in other embodiments and with the various modifications required by their particular application or use of the invention. It is intended that the appended claims be construed to include alternative embodiments to the extent permitted by the prior art.

What is claimed is:

1. A method for ordering communications stored in a user message box, comprising:
   placing a first plurality of messages in a user message box, wherein the user message box is maintained in data storage;
   determining for each of the first plurality of messages an associated identifier using application programming running on a processor, wherein at least a first message included in the first plurality of messages is associated with a first identifier, wherein at least a second message included in the first plurality of messages is associated with a second identifier, and wherein the first and second identifiers are different from one another;
   accessing by a user the user message box;
   determining using the application programming an amount of a message accessed by the user for each message in the first plurality of messages;
   from at least the determined amount of a message accessed by the user for each message in the first plurality of messages, predicting using the application programming a level of interest that the user will have in subsequent messages, wherein a first amount of the first message is accessed by the user, wherein a second amount of the second message is accessed by the user, wherein the first amount is greater than the second amount, wherein a first level of interest is predicted for messages associated with the first identifier, wherein a second level of interest is predicted for messages associated with the second identifier, and wherein the predicted first level of interest is higher than the predicted second level of interest;
   from the predicted level of interest, assigning by the application programming a first rank to the first identifier and a second rank to the second identifier.

2. The method of claim 1, wherein said predicting a level of interest comprises:
   presenting through a user output device at least one of information derived from the associated identifier and a message content for at least one of the first plurality of messages in the user message box to the user; and
   determining a user action with respect to the at least one of the first plurality of messages.

3. The method of claim 1, further comprising:
   at least second accessing by the user the user message box; and
   presenting through a user output device at least one message from the user message box to the user, wherein the order of presentation for the at least one message is determined by the rank assigned to each identifier for each message in the user message box.

4. The method of claim 1, further comprising:
   placing a second plurality of messages in the user message box;
   determining for each of the second plurality of messages an associated identifier using the application programming, wherein at least one of said second plurality of messages is associated with an identifier that is the same as an identifier associated with at least one of the first plurality of messages;
   for the at least one message included in the second plurality of messages having an identifier that is the same as an identifier associated with at least one of the first plurality of messages, ranking the message from the determined user action for the identifier associated with that message;
   for any message included in the second plurality of messages having an identifier that is not the same as an identifier associated with at least one of the first plurality of messages, assigning a default ranking;
   second accessing by a user the user message box; and
   presenting at least one message from the user message box to the user, wherein the order of presentation for the second plurality of messages is determined by the rank assigned to each identifier for each message.

5. The method of claim 2, wherein the messages comprise voice mail messages,
   wherein the user action with respect to any one of the first plurality of messages includes at least one of:
      listening to no more than a message header or a portion of the message header;
      listening to some percentage of the message following the message header;
   wherein assigning a rank to each of the identifiers includes:
      for messages that the user listened to some percentage of the message following the message header, assigning a rank according to the percentage of the message listened to;
      for messages that the user listened to no more than a message header or a portion of the message header, assigning a rank that is lower than a rank of any one of the messages that the user listened to some percentage of the message following the message header.

6. The method of claim 5, wherein messages that the user listened to no more than a message header or a portion of the message header are further ranked according to time received.

7. The method of claim 5, wherein assigning a rank to each of the identifiers includes determining for each identifier associated with multiple messages an average percentage of the message following the message header that the user listened to.

8. The method of claim 5, further comprising:
   receiving a user defined ranking for an identifier, wherein said user defined ranking overrides a determined ranking for the identifier.

9. The method of claim 5, wherein a rank assigned to each of the identifiers is revised each time the user accesses the user message box.

10. The method of claim 2, wherein the message comprises an email message,
   wherein the user action with respect to any one of the first plurality of messages includes opening a message; and
   wherein assigning a rank to each of the identifiers includes determining an order in which the messages were opened by the user.

11. The method of claim 1, wherein a first number of the messages include messages comprising text and a second number of the messages comprise voicemail messages.

12. A system for providing ordered messages, comprising:
   a messaging application operable to receive and store messages addressed to a user;
   a message ranking application operable to rank a communication endpoint identifier associated with each message received by the messaging application, wherein a predicted order of preference is determined from the past behavior of the user, wherein the past behavior includes an amount of each message accessed by the user, wherein a first communication endpoint identifier associated with a first message is ranked higher than a second communication endpoint identifier associated with a second message where the user accesses more of the first message than the second message, and wherein the received messages are ranked according to the ranking of the communication endpoint identifier associated with the message;
- a table in data storage containing the ranking determined by the message ranking application for each of a plurality of communication endpoint identifiers, wherein information identifying communication endpoints and an amount of a message accessed by the user from each identified communication endpoint is stored; and
- a user communication interface operable to access the messages stored by the messaging application, and wherein the messages are presented to the user in an order according to the rank determined by the message ranking application.

13. The system of claim 12, further comprising:
a communication network; and
a plurality of communication endpoints interconnected to the messaging application by the communication network, wherein each of said plurality of communication endpoints is associated with an identifier, and wherein each of said plurality of communication endpoints is linked to at least one message stored by said messaging application by a respective identifier.

14. The system of claim 13, further comprising:
a messaging server, wherein the messaging server is interconnected to the user communication interface, wherein the messaging application is running on the messaging server.

15. The system of claim 14, wherein the message ranking application is running on the messaging server.

16. The system of claim 14, wherein the communication network interconnecting the plurality of communication endpoints associated with an identifier to the messaging application includes a first communication network, and wherein the user communication interface is interconnected to the messaging server by a second communication network.

17. The system of claim 12, wherein the user communication interface comprises a telephone.

18. The system of claim 12, wherein the user communication interface comprises a general purpose computer running a communication application.

19. A messaging system for predicting a user order of preference, comprising:
- means for receiving and storing messages;
- means for determining an identifier associated with a received message;
- means for predicting a user preference comprising a ranking for association with messages from a particular identifier, wherein said predicted user preference is determined from past user action with respect to one or more other messages associated with the particular identifier, wherein said past user action includes a percentage of the one or more other messages associated with the particular identifier that is accessed by the user, and wherein a first identifier having a first percentage of the one or more other messages associated with the first identifier is ranked higher than a second identifier having a second percentage of the one or more messages associated with the second identifier where the first percentage is larger than the second percentage; and
- means for presenting messages to the user in an order representing the predicted user preference.

20. The system of claim 19, wherein said messages include voice mail messages, wherein said means for predicting a user preference includes means for determining an average percentage of previous messages associated with the particular identifier listened to by the user.

21. The system of claim 19, wherein said means for predicting a user preference includes means for determining an order in which the user accesses said stored messages.

* * * * *